United States Patent
Takahashi et al.

(10) Patent No.: US 7,754,094 B2
(45) Date of Patent: Jul. 13, 2010

(54) SINTERED FERRITE AND ITS PRODUCTION METHOD AND ELECTRONIC PART USING SAME

(75) Inventors: Masahiro Takahashi, Saitama-ken (JP); Syuichi Takano, Tottori-ken (JP)

(73) Assignee: Hitachi Metals Ltd., Tokyo (JP)

( * ) Notice: Subject to any disclaimer, the term of this patent is extended or adjusted under 35 U.S.C. 154(b) by 657 days.

(21) Appl. No.: 10/596,784

(22) PCT Filed: Dec. 24, 2004

(86) PCT No.: PCT/JP2004/019420

§ 371 (c)(1),
(2), (4) Date: May 9, 2007

(87) PCT Pub. No.: WO2005/061412

PCT Pub. Date: Jul. 7, 2005

(65) Prior Publication Data
US 2007/0290162 A1    Dec. 20, 2007

(30) Foreign Application Priority Data
Dec. 24, 2003    (JP) ............................. 2003-427872

(51) Int. Cl.
 *C04B 35/38* (2006.01)
 *H01F 1/34* (2006.01)
 *H01F 41/02* (2006.01)
(52) U.S. Cl. ............... 252/62.62; 252/62.59; 252/62.63
(58) Field of Classification Search .............. 252/62.62, 252/62.59, 62.63
See application file for complete search history.

(56) References Cited

U.S. PATENT DOCUMENTS 7,481,946 B2 * 1/2009 Takagawa et al. ........ 252/62.62

FOREIGN PATENT DOCUMENTS

| JP | 06-120022 | 4/1994 |
| JP | 06-267729 | 9/1994 |
| JP | 06-290926 | * 10/1994 |
| JP | 06-333726 | 12/1994 |
| JP | 07-211533 | 8/1995 |
| JP | 08-045725 | 2/1996 |
| JP | 11-329822 | 11/1999 |
| JP | 2000-159523 | 6/2000 |
| WO | WO 2004063117 | * 7/2004 |

OTHER PUBLICATIONS

D. Stopples, et al., "Monocrystalline High-Saturation Magnetization Ferrites For Video Recording Head Application", Journal of Magnetism and Magnetic Materials, 37, Received Jan. 19, 1983, -pp. 123-130.

M. Takahashi, et al., "Development of MnZn-Ferrites with High Bs at High Temperature", Ninth International Conference on Ferrites (ICF 9), Aug. 2004.

* cited by examiner

*Primary Examiner*—C. Melissa Koslow
(74) *Attorney, Agent, or Firm*—Sughrue Mion, PLLC

(57) ABSTRACT

A sintered ferrite body having a main composition comprising 63-80% by mol of $Fe_2O_3$, and 3-15% by mol of ZnO, the balance being manganese oxide; $R_{cal}$ determined from the $Fe_2O_3$ content X (% by mol) by the formula (1) of $R_{cal}=[200(X-50)]/(3X)$, and the ratio R (%) of $Fe^{2+}$ per the total amount of Fe in the sintered body meeting the condition of $R_{cal}-2.0 \leq R \leq R_{cal}+0.3$; and the sintered body having a density of 4.9 g/cm³ or more.

10 Claims, 2 Drawing Sheets

SINTERED FERRITE AND ITS PRODUCTION METHOD AND ELECTRONIC PART USING SAME

FIELD OF THE INVENTION

The present invention relates to a Mn—Zn sintered ferrite body having a high maximum magnetic flux density at as high temperatures as about 100° C., and an electronic part using such sintered ferrite.

BACKGROUND OF THE INVENTION

Integration, multi-functionalization and speed increase have recently been advancing in LSIs in various electronic apparatuses, requiring their power supplies to have higher power output. Taking note PCs for example, DC-DC converters have been required to provide larger current due to multi-functionalization and quality enhancement prompted by the speed-up of CPUs, the capacity and speed increase of memory devices, etc. Also, higher integration of parts causes electronic parts to generate more heat, elevating their environment temperature to near 100° C. Accordingly, DC-DC converters contained in note PCs comprising high-performance CPUs are required to be able to supply large current at actual environment temperatures.

DC-DC converters, etc. used in electric vehicles, hybrid vehicles, etc. are also operated in wide temperature ranges, so that they are required to exhibit enough performance even at 100° C. or higher. Accordingly, these in-vehicle DC-DC converters, etc. are required to be adaptable to higher temperatures and larger current.

Adaptability to higher temperatures and larger current is also required by choke coils constituting DC-DC converters, and their parts, magnetic cores. The choke coils are required to have high inductance even when large current is supplied at high temperatures. The magnetic cores are required to be usable at a frequency of several hundreds of kHz, and resistant to magnetic saturation even when large current is supplied at high temperatures.

Magnetic cores for choke coils, etc. are made of soft-magnetic metals such as silicon steel, amorphous alloys, soft-magnetic, fine-crystal alloys, etc., or ferrites. Although the soft-magnetic metals have higher saturation magnetic flux densities than those of ferrites, thus resistant to magnetic saturation even when large current is supplied, they are disadvantageous in a high cost, and low resistance that makes use at high frequencies impossible. On the other hand, the soft-magnetic ferrites can advantageously be used at high frequencies because of higher resistance than the soft-magnetic metals, in addition to a low cost. Among the soft-magnetic ferrites, Mn—Zn ferrite is suitable for large-current cores, because it has a higher saturation magnetic flux density than that of Ni—Zn ferrite.

Including those used for choke coils for DC-DC converters, conventional Mn—Zn ferrite generally comprises about 50-55% by mol of $Fe_2O_3$, and it is known that increase in the $Fe_2O_3$ content leads to a higher maximum magnetic flux density. However, when as much $Fe_2O_3$ as more than 60% by mol is contained, it has been difficult to produce sintered Mn—Zn ferrite having a high maximum magnetic flux density by a powder metallurgy method for the reasons described below, though single-crystal Mn—Zn ferrite has a high maximum magnetic flux density. In the sintering step of Mn—Zn ferrite, oxygen should be released from $Fe_2O_3$ in the spinelization reaction of reducing $Fe_2O_3$ to FeO, but the release of oxygen is insufficient in a composition with much excess $Fe_2O_3$, resulting in the likelihood that $Fe_2O_3$ remains as an undesirable phase (hematite phase), thus failing to obtain high magnetic properties (high magnetic flux density). In addition, because the spinelization reaction and the sintering are hindered, it is impossible to obtain a high-density sintered body, inevitably failing to a high maximum magnetic flux density.

The magnetic properties of ferrite generally tend to be influenced by temperatures. Particularly Mn—Zn ferrite has a high maximum magnetic flux density at room temperature, but its maximum magnetic flux density decreases as the temperature is elevated. The maximum magnetic flux density at a high temperature of about 100° C. is usually as low as about 75-80% of that at room temperature. Such reduction of a maximum magnetic flux density leads to the deterioration of DC bias current characteristics when used in choke coils. To obtain a high maximum magnetic flux density at a high temperature of about 100° C., it is necessary to compensate the reduction of a maximum magnetic flux density with temperature, by increasing the maximum magnetic flux density at room temperature, or by decreasing the reduction ratio of a maximum magnetic flux density as the temperature is elevated.

JP6-333726A discloses a method for producing Mn—Zn ferrite having a high maximum magnetic flux density without undesirable phases such as a wustite phase, a hematite phase, etc., by sintering a ferrite material comprising 62-68% of $Fe_2O_3$, 16-28% of MnO and 10-16% of ZnO by mol as main components, and at least one of CaO, $SiO_2$, $ZrO_2$ and CoO as a sub-component, together with an organic binder as a reducing agent in a inert gas. However, the composition described in JP6-333726A cannot provide the resultant sintered body with a sufficient maximum magnetic flux density at room temperature, and the maximum magnetic flux density decreases largely as the temperature is elevated. Accordingly, it is difficult to produce Mn—Zn ferrite having a high maximum magnetic flux density at a high temperature of 100° C.

JP11-329822A discloses a sintered Mn—Zn ferrite body having a high maximum magnetic flux density particularly at a high temperature of 100° C., which comprises 60-85% by mol of iron oxide, and 0-20% by mol of zinc oxide, the balance being manganese oxide, and has as high a maximum magnetic flux density as 450 mT or more at 100° C., with a small reduction ratio of a maximum magnetic flux density with temperature. However, despite the excess-Fe composition (as high $Fe_2O_3$ as more than 60% by mol), which is inherently expected to provide a high maximum magnetic flux density, sintered Mn—Zn ferrite has a density of less than 4.9 g/cm³, not on a sufficient level as compared with the theoretical density of 5.1-5.2 g/cm³. Further, the above excess-Fe composition may generate undesirable phases such as a hematite phase, etc. depending on the variations of production conditions, making it difficult to stably obtain Mn—Zn ferrite having a high maximum magnetic flux density.

As described above, the above maximum magnetic flux densities of the conventional Mn—Zn ferrites do not satisfy the requirements of increasingly higher temperatures and larger current. Thus, ferrites having higher maximum magnetic flux densities and choke coils adaptable to larger current are desired.

In the case of producing a sintered ferrite body having a composition with much excess Fe, a spinelization reaction should be accelerated and controlled more than usual Mn—Zn ferrites comprising 50-55% by mol of $Fe_2O_3$. Also, because undesirable phases such as a hematite phase, etc. are easily formed in the spinelization reaction, it is difficult to achieve a high maximum magnetic flux density with good reproducibility. When an organic binder is added as a reducing agent, too, its amount is limited from the aspect of moldability, and because its effects are different depending on the ferrite compositions, etc., it is difficult to obtain a sintered ferrite body having a high maximum magnetic flux density with good reproducibility.

OBJECTS OF THE INVENTION

Accordingly, an object of the present invention is to provide a method for mass-producing a sintered ferrite body having a composition with much excess Fe for having a high maximum magnetic flux density, stably at a low cost.

Another object of the present invention is to provide a sintered ferrite body having a much higher maximum magnetic flux density than those of conventional Mn—Zn ferrites particularly at as high a temperature as 100° C.

A further object of the present invention is to provide an electronic part using such sintered ferrite.

DISCLOSURE OF THE INVENTION

The sintered ferrite body of the present invention has a main composition comprising 63-80% by mol of $Fe_2O_3$, and 3-15% by mol of ZnO, the balance being manganese oxide; $R_{cal}$ determined from the $Fe_2O_3$ content X (% by mol) by the formula (1) of $R_{cal}=[200(X-50)]/(3X)$, and the ratio R (%) of $Fe^{2+}$ per the total amount of Fe in the sintered body meeting the condition of $R_{cal}-2.0 \leq R \leq R_{cal}+0.3$; and the sintered body having a density of 4.9 g/cm$^3$ or more.

The sintered ferrite body of the present invention preferably has a volume resistivity of 0.1 Ω·m or more. This enables the sintered ferrite body to have the same insulation as that of general Mn—Zn ferrites, with reduced core loss and a high maximum magnetic flux density.

The sintered ferrite body of the present invention preferably has a temperature at which its core loss is minimum (minimum-core-loss temperature) of 80° C.-120° C., to provide a ferrite core with a high maximum magnetic flux density, and make it suitable for use at as high a temperature as about 100° C.

The electronic part of the present invention comprising a magnetic core formed by the above sintered ferrite body, and winding.

The method of the present invention for producing the above sintered ferrite body comprises a step of adding a binder to ferrite powder, a molding step, a binder-removing step, and a sintering step; the ferrite powder having a spinelization ratio S of 10-60%; the amount V (% by weight) of the binder added being in a range of $1.3-0.02S \leq V \leq 2.3-0.02S$, assuming that the total amount of the ferrite powder and the binder is 100% by weight; and the oxygen concentration in the atmosphere from the binder-removing step to the completion of the sintering step being 0.1% or less by volume. This method provides a sintered ferrite body having a composition with much excess Fe and a properly controlled amount of $Fe^{2+}$ for having a high maximum magnetic flux density.

In the above method, the spinelization ratio of ferrite powder is preferably 10-40%. This achieves the mass-production of a sintered ferrite body having a high maximum magnetic flux density, even when a large amount of a binder is added to achieve high moldability.

The ferrite powder preferably has a specific surface area of 3000-7000 m$^2$/kg. This provides the sintered ferrite with a high density and a high maximum magnetic flux density.

The main composition of the sintered ferrite body of the present invention preferably comprises 68-75% by mol of $Fe_2O_3$, and 3-12% by mol of ZnO, the balance being manganese oxide. This provides the sintered ferrite with a high maximum magnetic flux density even at high temperatures.

The sintered ferrite body of the present invention preferably contains 0.02-0.3% by weight (calculated as $CaCO_3$) of Ca, and 0.003-0.015% by weight (calculated as $SiO_2$) of Si, as sub-components, per 100% by weight of the main composition. This provides the sintered ferrite with high maximum magnetic flux density and volume resistivity.

The sintered ferrite body of the present invention has a dramatically improved maximum magnetic flux density, which is particularly high at as high a temperature as 100° C. Electronic parts such as choke coils, etc. using such sintered ferrite can be used with large current at as high a temperature as about 100° C. The method of the present invention can stably produce a sintered ferrite body having a high maximum magnetic flux density without generating undesirable phases, even with a composition with much excess Fe, which is conventionally likely to generate undesirable phases under varied production conditions.

DESCRIPTION OF THE PREFERRED EMBODIMENTS

Figure 1:
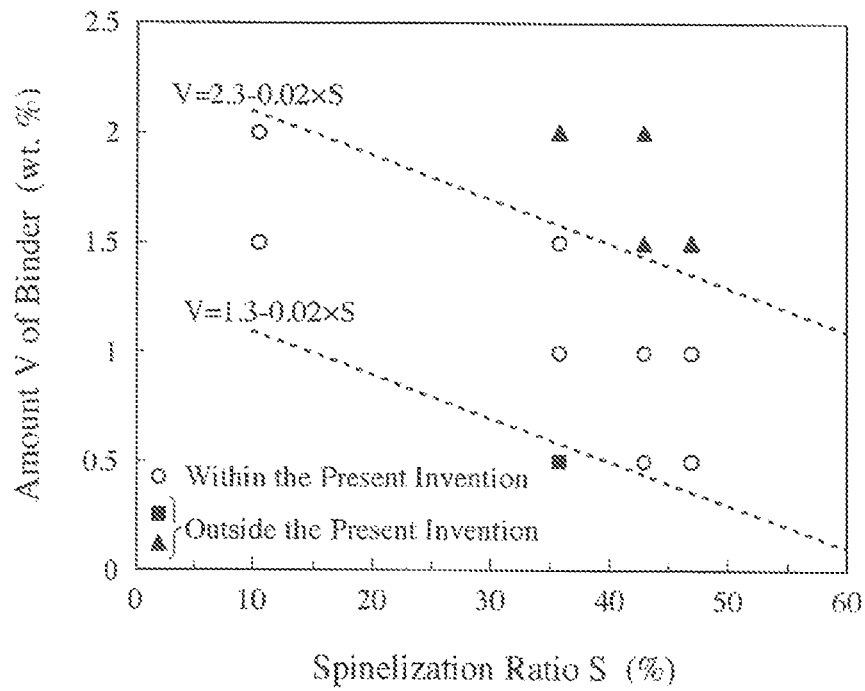
FIG. 1 is a graph showing the relation between the spinelization ratio of ferrite powder and the amount of a binder added.

The sintered ferrite body of the present invention can be produced by powder metallurgy methods usually used for the production of Mn—Zn ferrites. Namely, $Fe_2O_3$, manganese oxide (for instance, $Mn_3O_4$) and ZnO as main starting materials are mixed by a ball mill, etc., calcined, and then pulverized by a ball mill, etc. The resultant ferrite powder is mixed with a binder, etc., granulated by a spray drier, etc., and molded. The resultant green body is sintered.

The sintered ferrite body of the present invention has a main composition comprising 63-80% by mol of $Fe_2O_3$, and 3-15% by mol of ZnO, the balance being manganese oxide. With such a main composition, the resultant sintered ferrite body has a maximum magnetic flux density of 520 mT or more at 100° C. in a magnetic field of 1000 A/m, extremely higher than those of conventional sintered ferrites.

When the $Fe_2O_3$ content is less than 63% by mol, the maximum magnetic flux density drastically decreases as the temperature is elevated. Even though it is high at room temperature (20° C.), the maximum magnetic flux density of 520 mT or more cannot be obtained at 100° C. On the other hand, when the $Fe_2O_3$ content exceeds 80% by mol, a hematite phase ($Fe_2O_3$), an undesirable phase, tends to remain, resulting in the deterioration of soft magnetic properties such as permeability, etc. and decrease in the maximum magnetic flux density, also failing to achieve the maximum magnetic flux density of 520 mT or more at 100° C. Also, when the ZnO content is outside a range of 3-15% by mol, the sintered ferrite body has a reduced maximum magnetic flux density, which cannot be 520 mT or more at 100° C.

The $Fe_2O_3$ content is preferably 68-75% by mol. In this case, the sintered ferrite body can have extremely as high a maximum magnetic flux density as 540 mT or more at 100° C. in a magnetic field of 1000 A/m. Of course, the sintered ferrite body of the present invention has a higher maximum magnetic flux density than those of the conventional Mn—Zn ferrites even at temperatures higher than 100° C. Particularly because the sintered ferrite body containing 75-80% by mol of $Fe_2O_3$ has a maximum magnetic flux density of 500 mT or more even at 150° C., it is suitable for applications such as automobiles, etc. requiring high heat resistance.

With a composition comprising 68-80% by mol of $Fe_2O_3$, and 3-15% by mol of ZnO, the balance being manganese oxide, the sintered ferrite body has a Curie temperature of 410° C. or higher. The higher the Curie temperature, the smaller the change of the maximum magnetic flux density with temperature. When the Curie temperature is 410° C. or higher, the ratio of a maximum magnetic flux density at 100° C. to that at 20° C. (reduction ratio of a maximum magnetic flux density from 20° C. to 100° C.) is as small as 10% or less. Because the above reduction ratio of a maximum magnetic flux density is as large as about 20-25% in the conventional Mn—Zn ferrite having an Fe content of 50-55% by mol, the maximum magnetic flux density of the ferrite becomes extremely low by heat generated by surrounding electronic parts. However, because the sintered ferrite body of the present invention suffering little change of a maximum magnetic flux density with temperature is not susceptible to heat generated by surrounding electronic parts, electronic equipments comprising it are easily designed.

When containing 0.02-0.3% by weight (calculated as $CaCO_3$) of Ca, and 0.003-0.015% by weight (calculated as $SiO_2$) of Si as sub-components, the sintered ferrite body of the present invention has high volume resistivity and little core loss (particularly eddy current loss). When Ca is less than 0.02% by weight (calculated as $CaCO_3$), the volume resistivity is not sufficiently improved. When Ca exceeds 0.3% by weight, the sinterability decreases, resulting in a sintered body with reduced density and maximum magnetic flux density. When Si is less than 0.003% by weight (calculated as $SiO_2$), the volume resistivity is not sufficiently improved. When Si exceeds 0.015% by weight, coarse grains are formed in the sintered body structure, resulting in reduced magnetic properties and volume resistivity.

Although a larger $Fe^{2+}$ content generally leads to reduced volume resistivity, the inclusion of the sub-components in the above ranges provides a high-maximum-magnetic-flux-density sintered ferrite body having volume resistivity of 0.1 Ω·m or more on the same level as those of usual Mn—Zn ferrites, even with a composition having much excess Fe and an extremely large amount of $Fe^{2+}$. The use of sintered ferrite bodies having such high maximum magnetic flux density and low volume resistivity can avoid the design of electronic parts from becoming complicated.

For the purpose of improving the maximum magnetic flux density and reducing the core loss, Mn as a main component may be substituted by at least one selected from the group consisting of Co, Ni, Cu, Ti, Sn and Li, in an amount of 7% by mol or less per 100% by mol of the entire main components. Also, the sintered ferrite body of the present invention may contain a compound (oxide, etc.) of at least one selected from the group consisting of Nb, Zr, V, Ta, Bi, W, Mo, Al and rare earth metals (including Y), in an amount of 0.2% by weight or less per 100% by weight of the entire sintered body.

The core loss causing the heat generation of a sintered ferrite body is preferably as small as possible, and it is preferably 1700 kW/m³ or less at 50 kHz and 150 mT in such applications as DC-DC converters, etc. To prevent the rapid deterioration of inductance (thermal runaway), the minimum-core-loss temperature is generally set higher than the temperature of using the sintered ferrite body. With the minimum-core-loss temperature of 80° C.-120° C., the thermal runaway can be prevented even though the temperature of the electronic equipment becomes higher than room temperature. The minimum-core-loss temperature may be controlled by adjusting the compositions of the main components, etc. For instance, with a composition of 68-72% by mol of $Fe_2O_3$, and 3-12% by mol of ZnO, the balance being manganese oxide, the minimum-core-loss temperature is in a range of 80-120° C.

The sintered ferrite body of the present invention has a density of 4.9 g/cm³ or more. When the density is less than 4.9 g/cm³, the sintered ferrite body with as excessively high $Fe_2O_3$ content as 63-80% by mol has an extremely low maximum magnetic flux density, which cannot be 520 mT or more at 100° C. To obtain a higher maximum magnetic flux density, the sintered body preferably has a density of 4.95 g/cm³ or more.

The ratio R (%) of $Fe^{2+}$ to the total amount of Fe in the sintered ferrite body, and $R_{cal}$ determined by the formula of $R_{cal}=[200(X-50)]/(3X)$ meet the condition of $R_{cal}-2.0 \leq R \leq R_{cal}+0.3$. Because $Fe^{2+}$ has positive magnetic anisotropy, opposite to ions of the main components such as $Fe^{3+}$, etc., with different temperature dependency, the existence of $Fe^{2+}$ affects the temperature characteristics of initial permeability, etc. (for instance, so-called secondary peak temperature shift). Also, the existence of $Fe^{2+}$ affects the electric resistance of ferrite. The inventors have found that the amount of $Fe^{2+}$ has large influence on the maximum magnetic flux density as well as on the temperature characteristics of initial permeability.

In spinel ferrite having a composition generally represented by the formula of $Me.Fe_2O_4$, wherein Me is divalent metal ion, excess Fe exists as $Fe^{2+}$ when $Fe_2O_3$ exceeds 50% by mol. Assuming that the $Fe_2O_3$ content in Mn—Zn ferrite is X (% by mol), and that all trivalent metal ion sites are occupied by $Fe^{3+}$, the calculated percentage $R_{cal}$ (%) of $Fe^{2+}$ in the total Fe content is represented by the formula (1) of $R_{cal}=[200(X-50)]/(3X)$.

The formula (1) is derived as follows: assuming that the $Fe_2O_3$ content is X (% by mol), the content Y (% by mol) of (Mn+Zn) is 100-X (% by mol), and the amount of $Fe_2O_3$ necessary for forming a spinel phase with (Mn+Zn) is also 100-X (% by mol). Accordingly, the amount A (% by mol) of excess $Fe_2O_3$ is represented by $$A=X-(100-X)=2X-100.$$

Excess $Fe_2O_3$ is turned to $(\tfrac{2}{3})FeO.Fe_2O_3$ by a spinelization reaction. FeO comprises $Fe^{2+}$, and its amount B (% by mol) is represented by $$B=(2X-100)\times\tfrac{2}{3}=(4X-200)/3.$$

Thus, the percentage $R_{cal}$ (%) of $Fe^{2+}$ in the total Fe content (2X) is represented by $$R_{cal}=100[(4X-200)/3]/2X=[200(X-50)]/3X.$$

Because the amount of $Fe^{2+}$ varies in actual sintered ferrite depending on production conditions, the percentage of $Fe^{2+}$ is not necessarily equal to $R_{cal}$. As a result of investigation on the improvement of a maximum magnetic flux density in a main component composition with much excess Fe, the inventors have found that the controlling of the ratio R (%) of $Fe^{2+}$, which is variable depending on production conditions, in a range of $R_{cal}-2.0 \leq R \leq R_{cal}+0.3$ provides the sintered body with a remarkably higher maximum magnetic flux density than those of conventional sintered bodies.

When the percentage R of $Fe^{2+}$ is less than $R_{cal}-2.0$, a hematite phase remains as an undesirable phase, resulting in a low maximum magnetic flux density. On the other hand, when the percentage R of $Fe^{2+}$ exceeds $R_{cal}+0.3$, a wustite phase tends to be formed, also resulting in a low maximum magnetic flux density. It should be noted if the percentage R of $Fe^{2+}$ were outside the range of $R_{cal}-2.0 \leq R \leq R_{cal}+0.3$, undesirable phases would be easily formed, but the variation of the percentage R of $Fe^{2+}$ would change the maximum magnetic flux density even without forming undesirable phases. Specifically, the percentage R of $Fe^{2+}$ outside the range of the present invention would lower the maximum magnetic flux density even if there were no undesirable phases. Incidentally, although the density of the sintered body changes by controlling the percentage R of $Fe^2$, its maximum magnetic flux density changes more than expected by the change of the density of the sintered body.

The amount of $Fe^{2+}$ in the sintered ferrite body is determined by dissolving the sintered body in strong phosphoric acid, and titrating it with a standard solution of potassium dichromate using sodium diphenylamine-4-sulfonate as an indicator. The total amount of Fe is determined by decomposing the sintered body with hydrochloric acid, oxidizing $Fe^{2+}$ in Fe ($Fe^{2+}$, $Fe^{3+}$) entirely to $Fe^{3+}$ with hydrogen peroxide, reducing $Fe^{3+}$ to $Fe^{2+}$ with stannous chloride, and then titrating it with a standard solution of potassium dichromate.

To obtain a high maximum magnetic flux density by controlling the amount of $Fe^{2+}$, the spinelization ratio of ferrite powder S to be molded is 10-60%; the amount V (% by weight) of the binder added is in a range of $1.3-0.02S \leq V \leq 2.3-0.02S$, assuming that the total of the ferrite powder and the binder is 100% by weight; and the oxygen concentration in the atmosphere from the binder-removing step to the completion of the sintering step is 0.1% or less by volume. The spinelization ratio is represented by a percentage of $I_{311}/(I_{311}+I_{104})$, wherein $I_{311}$ represents the intensity of a 311-peak of a spinel phase (maximum-intensity peak of the spinel phase), and $I_{104}$ represents the intensity of a 104-peak of a hematite phase (maximum-intensity peak of the hematite phase), in a powder X-ray diffraction pattern. The amount of the binder added is represented by the percentage by weight of the binder per the total of the ferrite powder and the binder.

When the spinelization ratio of ferrite powder to be molded is less than 10%, large sintering deformation occurs, resulting in a sintered ferrite body with low dimensional accuracy, and a hematite phase tends to remain as an undesirable phase because of insufficient sinterability and spinelization, resulting in a sintered ferrite body with a low maximum magnetic flux density. When the spinelization ratio exceeds 60%, a wustite phase, an undesirable phase, tends to be formed, and the amount of a binder suitable for obtaining a high maximum magnetic flux density becomes extremely small, resulting in difficulty in suppressing undesirable phases and achieving good moldability. The preferred spinelization ratio is 10-40%. From the aspect of moldability and green body strength, a larger amount of a binder is desirable, although too much a binder causes excess reduction. When the spinelization ratio is 10-40%, a sintered ferrite body having a high maximum magnetic flux density can be obtained even though 1.5% or more by weight of a binder is added.

When the amount of the binder added is outside the range of $1.3-0.02S \leq V \leq 2.3-0.02S$, the percentage of $Fe^{2+}$ is also outside the range of the present invention, failing to obtain a high maximum magnetic flux density. From the aspect of moldability, the amount of the binder added is preferably 1.0-1.8% by weight. Organic binders are preferable in the present invention, and for instance, polyvinyl alcohol (PVA), etc. may be used.

When the oxygen concentration in the atmosphere from the binder-removing step to the completion of the sintering step is more than 0.1% by volume, a hematite phase, an undesirable phase, is formed, resulting in low magnetic properties such as a maximum magnetic flux density, permeability, etc. The preferred oxygen concentration is 0.01% or less by volume. The atmosphere gas is an inert gas, and it is preferably a nitrogen gas for cost reduction. The use of pure nitrogen makes the control of an oxygen concentration unnecessary. Also, the use of a reducing gas such as $H_2$, CO, hydrocarbons, etc. accelerates a spinelization reaction and improves sinterability. The term "from the binder-removing step to the completion of the sintering step" means a period from a time at which the binder starts to evaporate by heating to a time at which the sintering-temperature-keeping step ends. The binder-removing step need not be an independent step, but the binder evaporates in the course of temperature elevation from room temperature to the sintering temperature. Cooling after the sintering-temperature-keeping step may be conducted while being controlled to an equilibrium oxygen partial pressure, and it is preferably conducted in a nitrogen atmosphere for the purpose of simplification.

The relation between the spinelization ratio S and the amount of the binder added V and the percentage R of $Fe^{2+}$ per the total Fe content will be explained. For instance, in the case of a powder metallurgy method, the ferrite powder to be molded is usually obtained by pulverization after calcining, but the calcined ferrite powder has a spinelization ratio at several tens of percentage. When such ferrite powder is sintered, the spinelization ratio increases by an oxygen-removing reaction (reduction reaction), so that the spinelization ratio becomes 100% ideally after the completion of sintering. The ratio of $Fe^{2+}$ varies depending on the reduction reaction. Because the sintered ferrite body of the present invention contains much excess Fe as compared with the conventional Mn—Zn ferrites, the sintering atmosphere preferably has a low oxygen concentration to accelerate the oxygen-removing reaction.

JP11-329822A describes that calcining is preferably conducted in nitrogen, and JP6-333726A describes that the spinelization ratio of the calcined ferrite powder should be 60-90%. These are considered preferable to proceed a spinelization reaction before sintering ferrite powder with excess Fe, from which a large amount of oxygen should be released, but the oxygen-removing reaction is largely affected not only by an oxygen concentration in the sintering atmosphere, but also by the amount of a binder such as PVA, etc. This is because the thermal decomposition of a binder comprising C and H as main constituents generates reducing gases, which accelerate the oxygen-removing reaction. When the binder-removing step is conducted in the air, the binder is reacted with oxygen in the air, failing to accelerate the oxygen-removing reaction, but the oxygen-removing reaction is remarkably accelerated by carrying out the binder-removing step and the sintering step in a low-oxygen atmosphere such as nitrogen, etc.

Because extremely fine ferrite powder has a large specific surface area, its molding needs more binder than in the case of coarse ferrite powder. Accordingly, in the case of fine ferrite powder, reduction proceeds excessively, so that the percentage R of $Fe^{2+}$ in the resultant sintered ferrite body exceeds the range of $R_{cal}-2.0 \leqq R \leqq R_{cal}+0.3$. As a result, a wustite phase, an undesirable phase, is formed, resulting in deteriorated magnetic properties.

Because the percentage of $Fe^{2+}$ varies depending on the main component composition, calcining conditions, etc., it has been difficult to stably produce a sintered ferrite body with much excess Fe. However, with the spinelization ratio of ferrite powder, the amount of a binder added, and the oxygen concentration in the atmosphere from the binder-removing step to the completion of the sintering step within the ranges of the present invention, the percentage R of $Fe^{2+}$ can be in a range of $R_{cal}-2.0 \leqq R \leqq R_{cal}+0.3$, resulting in a sintered ferrite body with a high maximum magnetic flux density.

The sintering temperature is preferably in a range of 1150° C.-1250° C. When the sintering temperature is lower than 1150° C., the sintered body tends to have a low density and contain a hematite phase, an undesirable phase, resulting in a reduced maximum magnetic flux density. When the sintering temperature exceeds 1250° C., coarse grains abnormally grow in the sintered body, resulting in reduced magnetic properties such as maximum magnetic flux density, etc.

The spinelization ratio of ferrite powder can be controlled by the ferrite powder composition and the calcining atmosphere and temperature of ferrite powder, etc. Under the same calcining conditions, the more excess Fe in the ferrite powder used, the lower spinelization ratio. Also, the smaller the oxygen content in the calcining atmosphere, the higher the spinelization ratio. To achieve a spinelization ratio of 10-60%, the calcining atmosphere may be from nitrogen to the air, but calcining in the air is preferable from the aspect of mass-productivity and cost. Because too high a calcining temperature produces coarse calcined ferrite powder, the calcining temperature is preferably 800° C.-950° C.

The ferrite powder to be molded need only have a spinelization ratio of 10-60%, and may be obtained not only by calcining (solid-phase reaction of mixed powder), but also by hydrothermal synthesis, etc.

The maximum magnetic flux density of the sintered ferrite body depends on the amount of $Fe^{2+}$ and the density of the sintered body. The composition with much excess Fe can provide a high maximum magnetic flux density, although the resultant sintered body tends to have a low density. In the production of sintered ferrite by a powder metallurgy method, a higher sintering temperature generally provides higher density, but the inventors have found that when ferrite powder with much excess Fe is sintered in an atmosphere having an oxygen concentration of 0.1% or less by volume, a sintered body with improved density cannot be obtained even by elevating the sintering temperature.

As a result of intense research to increase the density of a sintered ferrite body, the inventors have found that when ferrite powder to be molded has a specific surface area in a range of 3000-7000 m²/kg, a sintered ferrite body having a uniform structure with as high density as 4.9 g/cm³ or more can be obtained even if the $Fe_2O_3$ content is as much excess as 63-80% by mol.

When the specific surface area of ferrite powder is less than 3000 m²/kg, the sintered body does not have a sufficiently increased density. When the specific surface area exceeds 7000 m²/kg, the handling of ferrite powder becomes difficult, and its pulverization needs much time, resulting in reduced productivity. Also, when extremely fine ferrite powder with a specific surface area exceeding 7000 m²/kg is used, coarse grains abnormally grow in the sintered ferrite, resulting in sintered body with reduced strength and deteriorated magnetic properties. The ferrite powder having a specific surface area of 3000-7000 m²/kg generally has an average particle size d50 of 0.9-1.8 μm. The average particle size can be measured by an air permeation method, but the average particle size measured by the air permeation method tends to be smaller than that measured by a laser diffraction method. To achieve high sintering density and maximum magnetic flux density, the ferrite powder more preferably has a specific surface area of 4000-7000 m²/kg. The specific surface area of the ferrite powder can be controlled by pulverization conditions such as pulverization time, etc. Incidentally, the specific surface area is measured by a BET method.

The present invention will be explained in more detail referring to Examples below without restrictive intention.

Example 1

$Fe_2O_3$ powder, $Mn_3O_4$ powder and ZnO powder weighed to have the composition shown in Table 1 were mixed by wet-ball-milling for 4 hours, dried, and then calcined at 900° C. for 1.5 hours in nitrogen. Incidentally, Sample 17 was calcined at 850° C. for 1.5 hours in the air. Each of the resultant calcined powders was mixed with 0.08% by weight (calculated as $CaCO_3$) of Ca, 0.006% by weight (calculated as $SiO_2$) of Si, and 0.03% by weight (calculated as $Ta_2O_5$) of Ta, and pulverized by wet-ball-milling for 15-20 hours to have a specific surface area in a range of 4000-7000 m²/kg. Specifically, the surface area was 4110 m²/kg in Sample 9. Each pulverized ferrite powder was mixed with PVA as a binder in the amount shown in Table 1, dried, and then granulated. The granulated ferrite powder was compression-molded to a ring shape, heated to 1175° C. at a temperature-elevating speed of 150° C./hour, and kept at 1175° C. for 8 hours for sintering. From the binder-removing step to the completion of the sintering step, and in the subsequent cooling step, a high-purity nitrogen gas having purity of 99.99% or more was used as an atmosphere gas.

The resultant ring-shaped sintered body having an outer diameter of 25 mm, an inner diameter of 15 mm, and a height of 5 mm was measured with respect to initial permeability μi at 10 kHz, and maximum magnetic flux densities ($Bm_{20° C.}$, $Bm_{100° C.}$, $BM_{150° C.}$) at 20° C., 100° C. and 150° C., respectively, in a magnetic field of 1000 A/m. The reduction ratio of a maximum magnetic flux density [100×($Bm_{20° C.}$−$Bm_{100° C.}$)/$Bm_{20° C.}$] was calculated when heated from 20° C. to 100° C. Further, a spinelization ratio was measured on each ferrite powder, and a density ds, volume resistivity ρ, a grain size, a Curie temperature Tc, the presence of an undesirable phase, and the percentage R of $Fe^{2+}$ in the total Fe content were measured on each sintered body. The density of each sintered body was measured by a water displacement method. The volume resistivity of each sintered body was measured by a two-terminal method with a conductive paste applied to a cut surface of a ring-shaped sample. The grain size of each sintered body was determined by taking an optical photomicrograph (1000 times) of a sample mirror-polished and etched by hydrochloric acid, counting the number of grains existing on a 10-cm-long line (corresponding to 100 μm) drawn on the optical photomicrograph, and dividing 100 μm by the number of grains. The presence of an undesirable phase in the sintered body was confirmed by observation by SEM and an optical microscope at 1000 times, and X-ray diffraction. The core loss was measured under the conditions of 50 kHz and 150 mT. The results are shown in Table 1.

TABLE 1

| Sample No. | Calcining Atmosphere | Composition (% by mol) | | | Spinelization Ratio (%) | Binder (wt. %) | ds (g/cm³) |
|---|---|---|---|---|---|---|---|
| | | $Fe_2O_3$ | MnO | ZnO | | | |
| 1* | Nitrogen | 85 | 5 | 10 | 23.8 | 1.5 | 5.10 |
| 2 | Nitrogen | 80 | 10 | 10 | 31.8 | 1.5 | 5.05 |
| 3 | Nitrogen | 75 | 20 | 5 | 29.8 | 1.5 | 4.97 |
| 4 | Nitrogen | 75 | 15 | 10 | 35.8 | 1.5 | 5.02 |
| 5 | Nitrogen | 75 | 10 | 15 | 39.8 | 1.5 | 5.00 |
| 6* | Nitrogen | 75 | 5 | 20 | 47.8 | 1.0 | 4.98 |
| 7* | Nitrogen | 70 | 27.5 | 2.5 | 26.7 | 1.0 | 4.95 |
| 8 | Nitrogen | 70 | 25 | 5 | 30.8 | 1.0 | 5.00 |
| 9 | Nitrogen | 70 | 20 | 10 | 43.0 | 1.0 | 4.99 |
| 10 | Nitrogen | 70 | 15 | 15 | 42.9 | 1.0 | 4.96 |
| 11* | Nitrogen | 70 | 10 | 20 | 52.1 | 1.0 | 4.96 |
| 12 | Nitrogen | 65 | 30 | 5 | 37.3 | 1.0 | 4.99 |
| 13 | Nitrogen | 65 | 25 | 10 | 46.9 | 1.0 | 4.99 |
| 14 | Nitrogen | 65 | 22.5 | 12.5 | 50.1 | 1.0 | 4.95 |
| 15* | Nitrogen | 60 | 30 | 10 | 53.8 | 1.0 | 4.97 |
| 16* | Nitrogen | 60 | 20 | 20 | 72.4 | 1.0 | 5.11 |
| 17 | Air | 70 | 20 | 10 | 10.5 | 1.7 | 4.97 |

| Sample No. | μi | Bm (mT) | | | Bm Reduction Ratio (%) | ρ (Ω·m) | Tc (°C.) | Rcal (%) | R (%) |
|---|---|---|---|---|---|---|---|---|---|
| | | 20° C. | 100° C. | 150° C. | | | | | |
| 1* | 126 | 534 | 514 | 501 | 3.7 | 0.59 | 508 | 27.5 | 26.5 |
| 2 | 173 | 558 | 535 | 515 | 4.1 | 0.67 | 485 | 25.0 | 24.3 |
| 3 | 218 | 553 | 544 | 527 | 1.6 | 0.73 | 470 | 22.2 | 21.9 |
| 4 | 229 | 571 | 548 | 526 | 4.0 | 0.71 | 456 | 22.2 | 21.7 |
| 5 | 226 | 570 | 535 | 506 | 6.1 | 0.68 | 448 | 22.2 | 22.1 |
| 6* | 212 | 515 | 471 | 435 | 8.5 | 0.67 | 445 | 22.2 | 21.9 |
| 7* | 219 | 476 | 476 | 405 | 0 | 0.63 | 457 | 19.0 | 18.7 |
| 8 | 289 | 563 | 560 | 490 | 0.5 | 0.63 | 442 | 19.0 | 18.9 |
| 9 | 363 | 575 | 552 | 500 | 4.0 | 0.75 | 428 | 19.0 | 19.0 |
| 10 | 428 | 576 | 535 | 483 | 7.1 | 0.62 | 415 | 19.0 | 18.9 |
| 11* | 352 | 540 | 499 | 445 | 7.6 | 0.44 | 403 | 19.0 | 19.0 |
| 12 | 311 | 615 | 520 | 456 | 15.4 | 0.77 | 406 | 15.4 | 15.4 |
| 13 | 967 | 634 | 531 | 465 | 16.2 | 0.75 | 391 | 15.4 | 15.7 |
| 14 | 1134 | 620 | 533 | 467 | 14.0 | 0.73 | 379 | 15.4 | 15.3 |
| 15* | 675 | 562 | 476 | 398 | 15.3 | 0.65 | 346 | 11.1 | 11.2 |
| 16* | 765 | 520 | 445 | 388 | 14.4 | 0.01 | 306 | 11.1 | 12.0 |
| 17 | 327 | 580 | 560 | 505 | 3.4 | 0.55 | 428 | 19.0 | 18.3 |

Note:
*Outside the range of the present invention.

It is clear from Table 1 that with the amounts of $Fe_2O_3$, MnO and ZnO, the percentage of $Fe^{2+}$ in the total Fe content ($Fe^{2+}+Fe^{3+}$), and the sintering density within the ranges of the present invention, the maximum magnetic flux density Bm of the sintered body was 520 mT or more at 100° C., extremely higher than that of the conventional sintered ferrite body. Also, the sintered ferrite bodies had volume resistivity of 0.1 μm or more, on the same level as that of the conventional Mn—Zn ferrite. On the contrary, when the amounts of the main components were outside the ranges of the present invention, a high maximum magnetic flux density was not obtained at 100° C. In the case of 68-80% by mol of $Fe_2O_3$ and 3-15% by mol of ZnO, the sintered Mn—Zn ferrite had a Curie temperature of 410° C. or higher, as high a maximum magnetic flux density as 520 mT or more at 100° C., and as small a reduction ratio of a maximum magnetic flux density with temperature as 10% or less from 20° C. to 100° C. Further, with a composition comprising 68-75% by mol of $Fe_2O_3$ and 3-12% by mol of ZnO, the balance being manganese oxide, the maximum magnetic flux density was as extremely high as 540 mT or more at 100° C. Although the powder X-ray diffraction analysis and the structural observation by SEM and an optical microscope confirmed a wustite phase, an undesirable phase, in Sample 16, no undesirable phases were observed in other Samples. In all Samples, the grain size was 4-6 μm.

With respect to Samples 8-11, 14 and 17, the core loss was measured. The results are shown in Table 2. As is clear from Table 2, the sintered ferrite bodies within the composition range of the present invention had high maximum magnetic flux densities, and as small core losses as 1700 kW/m³ or less at 50 kHz and 150 mT. When the main components of the sintered ferrite body were within the composition ranges of 68-72% by mol of $Fe_2O_3$, and 3-12% by mol of ZnO, the balance being manganese oxide, the minimum-core-loss temperature was in a range of 80-120° C., making the sintered bodies suitable for use near 100° C. Incidentally, when the $Fe_2O_3$ content was 75% or more by mol, heat generation was observed during the measurement of a core loss.

TABLE 2

| Sample | Core Loss (kW/m³) | | | | | | | Minimum-Core-Loss Temperature |
|---|---|---|---|---|---|---|---|---|
| No. | 20° C. | 40° C. | 60° C. | 80° C. | 100° C. | 120° C. | 140° C. | (° C.) |
| 8 | 1582 | 1265 | 947 | 620 | 1089 | 1397 | 1530 | 80° C. |
| 9 | 1650 | 1392 | 1128 | 883 | 606 | 459 | 505 | 120° C. |
| 10 | 1429 | 1243 | 1065 | 868 | 671 | 493 | 372 | 140° C. or higher |
| 11* | 1496 | 1301 | 1106 | 928 | 772 | 656 | 559 | 140° C. or higher |
| 14 | 520 | 351 | 223 | 326 | 457 | 583 | 710 | 60° C. |
| 17 | 1344 | 1071 | 872 | 696 | 481 | 664 | 683 | 100° C. |

Note:
*Outside the range of the present invention.

Example 2

$Fe_2O_3$ powder, ZnO powder and $Mn_3O_4$ powder were weighed to a composition comprising 70% by mol of $Fe_2O_3$, and 10% by mol of ZnO, the balance being MnO, mixed by wet-ball-milling for 4 hours, dried, and then calcined at 900° C. for 1.5 hours in nitrogen. The resultant calcined powder was mixed with $CaCO_3$ powder and $SiO_2$ powder in the amounts shown in Table 3, pulverized by wet-ball-milling for 20 hours, further mixed with 1.0% by weight of PVA as a binder, dried, and then granulated. The granulated powder was compression-molded to a ring shape, heated to 1175° C. at a temperature-elevating speed of 150° C./hour, and kept at 1175° C. for 8 hours for sintering. A nitrogen atmosphere was used from the binder-removing step to the completion of the sintering step and during the subsequent cooling step, like in Example 1. The spinelization ratio of ferrite powder to be molded was 42%. The resultant ring-shaped sintered body having an outer diameter of 25 mm, an inner diameter of 15 mm and a height of 5 mm was measured with respect to initial permeability $\mu i$ at 10 kHz, and a maximum magnetic flux density at 20° C. and 100° C. in a magnetic field of 1000 A/m. Also measured were the spinelization ratio of ferrite powder, the density ds and volume resistivity $\rho$ of the sintered body, and the core loss of the sintered body at its minimum-core-loss temperature. The measurement conditions were the same as in Example 1. The results are shown in Table 3.

Example 3

Figure 2:
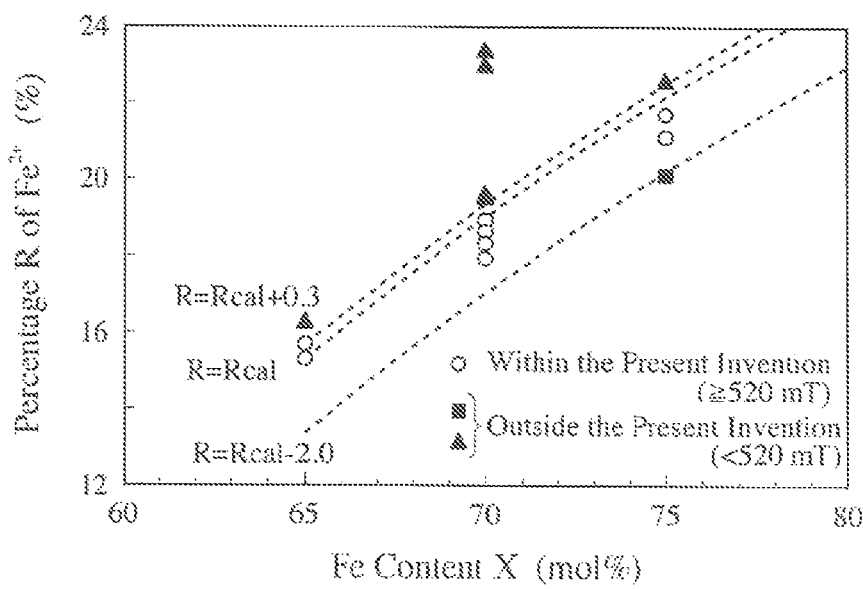
FIG. 2 is a graph showing the relation between the Fe content in the sintered ferrite body and the percentage R of $Fe^{2+}$, and a maximum magnetic flux density at 100° C.

$Fe_2O_3$ powder, $Mn_3O_4$ powder and ZnO powder were weighed to the composition shown in Table 4, mixed by wet-ball-milling for 4 hours, dried, and then calcined at 900° C. for 1.5 hours in nitrogen. Samples 41 and 42 were separately calcined at 850° C. for 1.5 hours in the air. Each calcined powder was mixed with 0.08% by weight of $CaCO_3$ powder, 0.006% by weight of $SiO_2$ powder, and 0.03% by weight of $Ta_2O_5$ powder, and pulverized by wet-ball-milling for such controlled pulverization time as to provide a specific surface area of 4000-7000 m²/kg. The resultant pulverized powder was mixed with PVA as a binder in the amount shown in Table 4, dried, and then granulated. The granulated powder was compression-molded to a ring shape, heated to 1175° C. at a temperature-elevating speed of 150° C./hour, kept at 1175° C. for 8 hours for sintering. A nitrogen atmosphere was used from the binder-removing step to the completion of the sintering step and during the subsequent cooling step, like in Example 1. The resultant ring-shaped sintered body having an outer diameter of 25 mm, an inner diameter of 15 mm and a height of 5 mm was measured with respect to initial permeability $\mu i$ at 10 kHz, and a maximum magnetic flux density at 20° C. and 100° C. in a magnetic field of 1000 A/m. Also measured were the spinelization ratio of ferrite powder, the density ds and volume resistivity $\rho$ of the sintered body, and the percentage R of Fe in the total Fe content in the sintered body. The results are shown in Table 4. The relation between the spinelization ratio and the amount of the binder added is shown in FIG. 1, and the relation between the Fe content and the percentage R of $Fe^{2+}$ in the sintered ferrite and the maximum magnetic flux density at 100° C. is shown in FIG. 2.

TABLE 3

| Sample | $CaCO_3$ | $SiO_2$ | ds | | Bm (mT) | | $\rho$ | Core Loss |
|---|---|---|---|---|---|---|---|---|
| No. | (wt. %) | (wt. %) | (g/cm³) | $\mu i$ | 20° C. | 100° C. | ($\Omega \cdot m$) | (kW/m³) |
| 18 | 0.01 | 0.006 | 5.03 | 314 | 588 | 565 | 0.06 | 737 |
| 19 | 0.08 | 0 | 5.01 | 327 | 532 | 525 | <0.01 | 1044 |
| 20 | 0.08 | 0.003 | 4.99 | 315 | 557 | 541 | 0.23 | 823 |
| 21 | 0.08 | 0.006 | 4.98 | 391 | 584 | 559 | 0.41 | 459 |
| 22 | 0.08 | 0.02 | 4.99 | 272 | 553 | 543 | 0.05 | 749 |
| 23 | 0.15 | 0.006 | 4.95 | 440 | 584 | 554 | 0.83 | 349 |
| 24 | 0.30 | 0.006 | 4.92 | 332 | 564 | 527 | 0.43 | 776 |
| 25* | 0.40 | 0.006 | 4.89 | 315 | 547 | 513 | 0.40 | 812 |

Note:
*Outside the range of the present invention.

It is clear from Table 3 that the addition of 0.02-0.3% by weight (calculated as $CaCO_3$) of Ca and 0.003-0.015% by weight (calculated as $SiO_2$) of Si provided sintered ferrite bodies with volume resistivity of 0.1 $\Omega \cdot m$ or more and a high maximum magnetic flux density.

TABLE 4

| Sample No. | Composition (% by mol) | | | Spinelization Ratio (%) | Binder (% by weight) |
|---|---|---|---|---|---|
| | Fe$_2$O$_3$ | MnO | ZnO | | |
| 26* | 75 | 15 | 10 | 35.8 | 0.5 |
| 27 | | | | | 1.0 |
| 28 | | | | | 1.5 |
| 29* | | | | | 2.0 |
| 30 | 70 | 20 | 10 | 43.0 | 0.5 |
| 31 | | | | | 1.0 |
| 32* | | | | | 1.5 |
| 33* | | | | | 2.0 |
| 34 | 65 | 25 | 10 | 46.9 | 0.5 |
| 35 | | | | | 1.0 |
| 36* | | | | | 1.5 |
| 37 | 70 | 15 | 15 | 42.9 | 0.5 |
| 38 | | | | | 1.0 |
| 39* | | | | | 1.5 |
| 40* | | | | | 2.0 |
| 41 | 70 | 20 | 10 | 10.5 | 1.5 |
| 42 | | | | | 2.0 |

| Sample No. | ds (g/cm$^3$) | μi | Bm (mT) 20° C. | Bm (mT) 100° C. | ρ (Ω·m) | R$_{cal}$ (%) | R (%) | Crystal Size (μm) | Undesirable Phase |
|---|---|---|---|---|---|---|---|---|---|
| 26* | 4.94 | 127 | 513 | 493 | 0.88 | 22.2 | 20.1 | 5.4 | Hematite |
| 27 | 4.97 | 240 | 536 | 520 | 0.86 | | 21.1 | 6.8 | Non |
| 28 | 5.02 | 229 | 571 | 548 | 0.71 | | 21.7 | 4.9 | Non |
| 29* | 5.07 | 188 | 474 | 476 | <0.01 | | 22.6 | 21.7 | Wustite |
| 30 | 4.91 | 366 | 553 | 524 | 1.02 | 19.0 | 17.9 | 4.8 | Non |
| 31 | 4.99 | 373 | 585 | 559 | 0.59 | | 18.6 | 5.2 | Non |
| 32* | 5.07 | 318 | 508 | 515 | <0.01 | | 19.6 | 17.9 | Wustite |
| 33* | 5.06 | 233 | 369 | 373 | <0.01 | | 23.4 | 19.2 | Wustite |
| 34 | 4.94 | 892 | 611 | 521 | 1.18 | 15.4 | 15.3 | 4.9 | Non |
| 35 | 4.99 | 967 | 634 | 531 | 0.75 | | 15.7 | 5.7 | Non |
| 36* | 5.01 | 625 | 529 | 478 | <0.01 | | 16.3 | 17.9 | Wustite |
| 37 | 4.91 | 357 | 558 | 520 | 1.03 | 19.0 | 18.9 | 4.4 | Non |
| 38 | 4.96 | 428 | 576 | 535 | 0.62 | | 18.9 | 5.4 | Non |
| 39* | 5.12 | 297 | 512 | 505 | 0.06 | | 19.5 | 17.9 | Non |
| 40* | 5.09 | 179 | 311 | 339 | <0.01 | | 23.0 | 16.1 | Wustite |
| 41 | 4.97 | 341 | 574 | 553 | 0.58 | 19.0 | 18.3 | 5.1 | Non |
| 42 | 4.99 | 355 | 551 | 521 | 0.50 | | 18.6 | 5.9 | Non |

Note:
*Outside the range of the present invention.

As shown in Table 4 and FIGS. 1 and 2, not only the percentage R of Fe$^{2+}$ in the total Fe content but also the maximum magnetic flux density varied depending on the amount of the binder added. Further, with the spinelization ratio of ferrite powder and the amount of the binder added within the ranges of the present invention, the percentage R of Fe$^{2+}$ in the total Fe content was made in a range of R$_{cal}$−2.0≦R≦R$_{cal}$+0.3, resulting in a high maximum magnetic flux density. On the contrary, when the amount V of the binder was outside the range of 1.3−0.02S≦V≦2.3−0.02S, the percentage R of Fe$^{2+}$ in the total Fe t was outside the range of R$_{cal}$−2.0≦R≦R$_{cal}$+0.3, and as high a maximum magnetic flux density as exceeding 520 mT was not obtained. When the percentage R of Fe$^{2+}$ in the total Fe content was outside the above range, undesirable phases such as a hematite phase, a wustite phase, etc. tended to be formed. Particularly when the percentage R of Fe$^{2+}$ in the total Fe content exceeded R$_{cal}$+0.3, crystal grains became coarser to 10 μm or more, resulting in volume resistivity drastically reduced to less than 0.1 Ω·m.

Example 4

Fe$_2$O$_3$ powder, ZnO powder and Mn$_3$O$_4$ powder were weighed such that Fe$_2$O$_3$ was 70% by mol, and ZnO was 10% by mol, the balance being MnO, mixed by wet-ball-milling for 4 hours, dried, and then calcined at 900° C. for 1.5 hours in nitrogen. The resultant calcined powder was mixed with 0.08% by weight (calculated as CaCO$_3$) of Ca, 0.006% by weight (calculated as SiO$_2$) of Si, and 0.03% by weight (calculated as Ta$_2$O$_5$) of Ta, pulverized by wet-ball-milling for 20 hours, further mixed with 1.0% by weight of PVA as a binder, dried, and then granulated. The granulated powder was compression-molded to a ring shape, heated to 1175° C. at a temperature-elevating speed of 150° C./hour, and kept at 1175° C. for 8 hours for sintering. An atmosphere having the oxygen concentration shown in Table 5 was used from the binder-removing step to the completion of the sintering step, and a nitrogen atmosphere was used in the subsequent cooling step. The spinelization ratio of ferrite powder to be molded was 42%. The resultant ring-shaped sintered body having an outer diameter of 25 mm, an inner diameter of 15 mm and a height of 5 mm was measured with respect to density ds, initial permeability μi at 10 kHz, and a maximum magnetic flux density at 20° C. and 100° C. in a magnetic field of 1000 A/m. The results are shown in Table 5.

TABLE 5

| Sample No. | Oxygen Concentration in Atmosphere (vol. %) | ds (g/cm$^3$) | μi | Bm (mT) 20° C. | Bm (mT) 100° C. | Undesirable Phases |
|---|---|---|---|---|---|---|
| 43* | 5 | 5.00 | 49 | 95 | 79 | Hematite |
| 44* | 0.5 | 5.01 | 172 | 526 | 491 | Hematite |
| 45 | 0.05 | 5.02 | 262 | 571 | 550 | Non |
| 46 | 0.005 | 4.99 | 373 | 585 | 559 | Non |

Note:
*Outside the range of the present invention.

As shown in Table 5, with 0.1% or less by volume of an oxygen concentration in the atmosphere from the binder-removing step to the completion of the sintering step, the generation of undesirable phases was suppressed, resulting in a high maximum magnetic flux density. When the oxygen concentration in the atmosphere exceeded 0.1% by volume, a hematite phase as an undesirable phase was generated, resulting in reduced initial permeability and maximum magnetic flux density. This appears to be due to the fact that even with properly controlled spinelization ratio of ferrite powder and binder content, the atmosphere with a high oxygen concentration would make it impossible to maintain a reducing atmosphere and kill the reducing action of the binder.

Example 5

Fe$_2$O$_3$ powder, ZnO powder and Mn$_3$O$_4$ powder were weighed such that Fe$_2$O$_3$ was 70% by mol, and ZnO was 10% by mol, the balance being MnO, mixed by wet-ball-milling for 4 hours, dried, and then calcined at 850° C. for 1.5 hours in the air. The resultant calcined powder was mixed with 0.08% by weight (calculated as CaCO$_3$) of Ca, 0.006% by weight (calculated as SiO$_2$) of Si, and 0.03% by weight (calculated as Ta$_2$O$_5$) of Ta, pulverized by wet-ball-milling for the pulverization time shown in Table 6, further mixed with 1.5% by weight of PVA as a binder, dried, and then granulated. The granulated powder was compression-molded to a ring shape, heated to 1175° C. at a temperature-elevating speed of 150° C./hour, and kept at 1175° C. for 8 hours for sintering. A nitrogen atmosphere was used from the binder-removing step to the completion of the sintering step and during the subsequent cooling step, like in Example 1. The spinelization ratio of ferrite powder to be molded was 11%. The resultant ring-shaped sintered body having an outer diameter of 25 mm, an inner diameter of 15 mm and a height of 5 mm was measured with respect to density ds, initial permeability μi at 10 kHz, and a maximum magnetic flux density at 20° C. and 100° C. in a magnetic field of 1000 A/m. The specific surface area S of the ferrite powder was measured by a BET method. The average particle size d50 was determined from a particle size distribution measured by a laser diffraction-type particle size distribution meter available from Horiba, Ltd. The results are shown in Table 6.

TABLE 6

| Sample No. | Pulverization Time (hours) | S (m$^2$/kg) | Average Particle Size d50 (μm) | ds (g/cm$^3$) | μi | Bm (mT) 20° C. | Bm (mT) 100° C. |
|---|---|---|---|---|---|---|---|
| 47* | 5 | 2210 | 1.83 | 4.77 | 507 | 546 | 513 |
| 48 | 10 | 3570 | 1.42 | 4.91 | 423 | 556 | 526 |
| 49 | 15 | 4850 | 1.25 | 4.98 | 371 | 581 | 554 |
| 50 | 20 | 6340 | 1.10 | 5.05 | 267 | 580 | 555 |

Note:
*Outside the range of the present invention.

As shown in Table 6, using the ferrite powder having a specific surface area in a range of 3000-7000 m$^2$/kg, the resultant sintered body had high density and a high maximum magnetic flux density. Particularly with the specific surface area of 4000-7000 m$^2$/kg, higher density and maximum magnetic flux density were obtained.

Example 6

Fe$_2$O$_3$ powder, ZnO powder and Mn$_3$O$_4$ powder were weighed such that Fe$_2$O$_3$ was 70% by mol, and ZnO was 10% by mol, the balance being MnO, mixed by wet-ball-milling for 4 hours, dried, and then calcined at 950° C. for 1.5 hours in nitrogen. The resultant calcined powder was mixed with 0.08% by weight (calculated as CaCO$_3$) of Ca, 0.006% by weight (calculated as SiO$_2$) of Si, and 0.03% by weight (calculated as Ta$_2$O$_5$) of Ta, pulverized by wet-ball-milling for 10 hours, further mixed with 1.0% by weight of PVA as a binder, dried, and then granulated. The granulated powder was compression-molded to a cylindrical shape, heated to 1175° C. at a temperature-elevating speed of 150° C./hour, and kept at 1175° C. for 8 hours for sintering. A nitrogen atmosphere was used from the binder-removing step to the completion of the sintering step and during the subsequent cooling step, like in Example 1. The spinelization ratio of ferrite powder to be molded was 46%.

Figure 3:
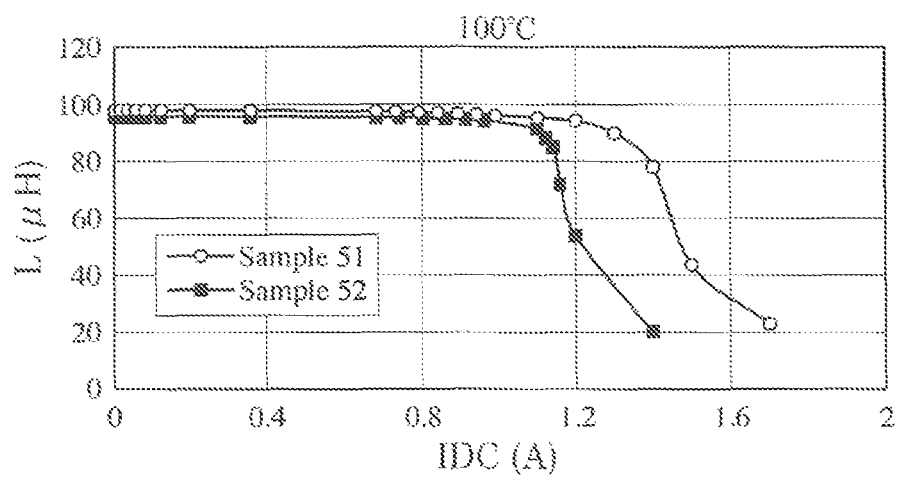
FIG. 3 is a graph showing the DC bias current characteristics of Samples 51 and 52.
Figure 3:
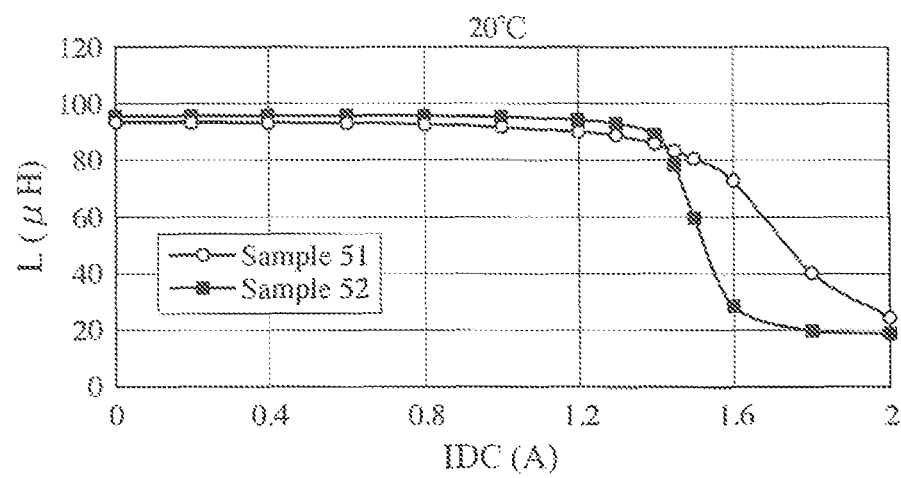
Figure 4:
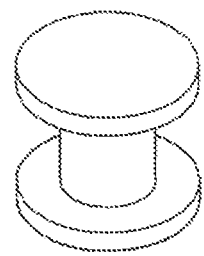
FIG. 4 is a perspective view showing the shape of a core for measuring the DC bias current characteristics.

The resultant cylindrical sintered body having an outer diameter of 8.5 mm and a height of 4 mm (Sample 51) was machined to a drum-shaped core shown in FIG. 4. A 2-UEW wire of 0.25 mm in diameter was wound around this drum-shaped core in 50 turns. DC bias current characteristics were measured at 20° C. and 100° C. under the conditions of a frequency of 100 kHz and current of 1 mA. The results are shown in FIG. 3.

For comparison, a sintered ferrite body (Sample 52) having a composition comprising 53% by mol of $Fe_2O_3$, 7% by mol of ZnO and 40% by mol of MnO was machined to the same drum-shaped core as in Sample 51. A 2-UEW wire of 0.25 mm in diameter was wound around this drum-shaped core in 47 turns. The DC bias current characteristics were measured under the same conditions as in Sample 51. The results are shown in FIG. 3.

Table 7 shows the compositions and maximum magnetic flux densities of Samples 51 and 52. As is clear from FIG. 3, Sample 51 within the range of the present invention had better DC bias current characteristics than those of Sample 52 outside the range of the present invention.

TABLE 7

| Sample | Composition (% by mol) | | | Bm (mT) | |
| --- | --- | --- | --- | --- | --- |
| No. | $Fe_2O_3$ | MnO | ZnO | 20° C. | 100° C. |
| 51 | 70 | 20 | 10 | 589 | 550 |
| 52* | 53 | 40 | 7 | 532 | 439 |

Note:
*Outside the range of the present invention.

INDUSTRIAL AVAILABILITY

Because the sintered ferrite body of the present invention has a high maximum magnetic flux density, it can be used for parts such as cores for DC-DC converters, etc. Particularly because it has an extremely higher maximum magnetic flux density than those of conventional Mn—Zn ferrites at a high temperature of 100° C., it is suitable for coil parts in electronic apparatuses used at high temperatures. Such sintered ferrite body can be stably produced by the method of the present invention at a low cost.

What is claimed is:

1. A sintered ferrite body having a main composition comprising 68-75% by mol of $Fe_2O_3$, and 3-12% by mol of ZnO, the balance being manganese oxide; $R_{cal}$ determined from the $Fe_2O_3$ content X (% by mol) by the formula (1) of $R_{cal}=[200(X-50)]/(3X)$, and the ratio R (%) of $Fe^{2+}$ per the total amount of Fe in said sintered body meeting the condition of $R_{cal}-2.0 \leq R \leq R_{cal}+0.3$; said sintered body having a density of 4.9 g/cm³ or more; and said sintered ferrite body having a maximum magnetic flux density of 544 mT or more measured at 100° C. in a magnetic field of 1000 A/m.

2. The sintered ferrite body according to claim 1, comprising 0.02-0.3% by weight (calculated as $CaCO_3$) of Ca, and 0.003-0.015% by weight (calculated as $SiO_2$) of Si, as sub-components, per 100% by weight of the main composition.

3. The sintered ferrite body according to claim 1, wherein said sintered ferrite body has volume resistivity of 0.1 Ω·m or more.

4. The sintered ferrite body according to claim 1, wherein said sintered ferrite body has a minimum-core-loss temperature of 80° C.-120° C.

5. An electronic part formed by winding a wire around a magnetic core comprising the sintered ferrite body recited in claim 1.

6. A method for producing a sintered ferrite body having a main composition comprising 68-75% by mol of $Fe_2O_3$, and 3-12% by mol of ZnO, the balance being manganese oxide; $R_{cal}$ determined from the $Fe_2O_3$ content X (% by mol) by the formula (1) of $R_{cal}=[200(X-50)]/(3X)$, and the ratio R (%) of $Fe^{2+}$ per the total amount of Fe in the sintered body meeting the condition of $R_{cal}-2.0 \leq R \leq R_{cal}+0.3$; said sintered body having a density of 4.9 g/cm³ or more; and said sintered ferrite body having a maximum magnetic flux density of 544 mT or more measured at 100° C. in a magnetic field of 1000 A/m, said method comprising a step of adding a binder to ferrite powder, a molding step, a binder-removing step and a sintering step, said ferrite powder having a spinelization ratio S of 10-60%; the amount V (% by weight) of said binder added being in a range of $1.3-0.02S \leq V \leq 2.3-0.02S$, assuming that the total amount of said ferrite powder and said binder is 100% by weight; the oxygen concentration in the atmosphere from said binder-removing step to the completion of said sintering step in a temperature range of 1150-1250° C. being 0.1% or less by volume.

7. The method for producing a sintered ferrite body according to claim 6, wherein said spinelization ratio of ferrite powder is 10-40%.

8. The method for producing a sintered ferrite body according to claim 6, wherein said ferrite powder has a specific surface area of 3000-7000 m²/kg.

9. The method for producing a sintered ferrite body according to claim 6, wherein 0.02-0.3% by weight (calculated as $CaCO_3$) of Ca, and 0.003-0.015% by weight (calculated as $SiO_2$) of Si are added as sub-components to 100% by weight of said main composition.

10. The sintered ferrite body according to claim 1, wherein said sintered ferrite body has a reduction ratio of a maximum magnetic flux density from 20° C. to 100° C. of 10% or less.

* * * * *